(12) United States Patent
Hamada et al.

(10) Patent No.: US 10,693,362 B2
(45) Date of Patent: Jun. 23, 2020

(54) SWITCHING POWER SUPPLY

(71) Applicant: FDK CORPORATION, Tokyo (JP)

(72) Inventors: Kenji Hamada, Tokyo (JP); Tadashi Sato, Tokyo (JP); Norio Fukui, Tokyo (JP)

(73) Assignee: FDK CORPORATION, Tokyo (JP)

( * ) Notice: Subject to any disclaimer, the term of this patent is extended or adjusted under 35 U.S.C. 154(b) by 0 days.

(21) Appl. No.: 16/226,260

(22) Filed: Dec. 19, 2018

(65) Prior Publication Data

US 2019/0199197 A1 Jun. 27, 2019

(30) Foreign Application Priority Data

Dec. 25, 2017 (JP) ................ 2017-248098

(51) Int. Cl.
| | | |
|---|---|---|
| *H02M 3/337* | (2006.01) | |
| *H02M 1/08* | (2006.01) | |
| *H02M 3/335* | (2006.01) | |
| *H02M 1/00* | (2006.01) | |
| *H02M 1/38* | (2007.01) | |

(52) U.S. Cl.
CPC ......... *H02M 1/083* (2013.01); *H02M 3/3376* (2013.01); *H02M 3/33569* (2013.01); *H02M 1/38* (2013.01); *H02M 2001/0009* (2013.01)

(58) Field of Classification Search
CPC . H02M 2007/4818; H02M 2007/4815; H02M 2007/4811; H02M 2001/0058; H02M 2001/00; H02M 2003/1557; H02M 3/33538; H02M 3/33546; H02M 3/33515; H02M 3/33576; H02M 3/33553; H02M 3/33507; H02M 3/33592; H02M 3/33523; H02M 3/3353; H02M 3/33569
See application file for complete search history.

(56) References Cited

U.S. PATENT DOCUMENTS

| | | | |
|---|---|---|---|
| 2014/0036547 A1* | 2/2014 | Matsuura .......... | H02M 3/33507 363/21.02 |
| 2016/0181921 A1* | 6/2016 | Zhang .................. | H02M 3/158 323/271 |
| 2016/0241152 A1* | 8/2016 | Wakabayashi ......... | H02M 1/32 |

FOREIGN PATENT DOCUMENTS

| | | |
|---|---|---|
| JP | 2004-140913 B | 5/2004 |
| JP | 2016-111805 B | 6/2016 |

* cited by examiner

*Primary Examiner* — Bryan R Perez
(74) *Attorney, Agent, or Firm* — Kinney & Lange, P.A.

(57) ABSTRACT

A switching power supply includes an insulated transformer, a full-bridge circuit which converts input DC power into AC power and outputs the AC power to a primary-side coil, an output circuit which converts AC power input from secondary-side coils into DC power and outputs the DC power, and a control circuit which controls the full-bridge circuit by using a phase shift method based on voltage output by the output circuit. When a measured value of the amount of phase shift determined from at least one of the voltage and current output by the output circuit is smaller than a theoretical value of the amount of phase shift corresponding to the switching power supply operating in a continuous current mode, the control circuit prolongs dead time used in the full-bridge circuit in accordance with the difference between the measured value and the theoretical value.

5 Claims, 6 Drawing Sheets

SWITCHING POWER SUPPLY

BACKGROUND

Technical Field

The present disclosure relates to a switching power supply.

Description of the Related Art

As one power converter that converts input voltage into desired voltage and outputs the converted voltage, a switching power supply using a full-bridge circuit is widely used. For example, Japanese Patent Nos. 5,866,614 (Japanese Publication No. 2016-111805) and 3,706,852 (Japanese Publication No. 2004-140913) each disclose a switching power supply that serves as a DC-DC converter that converts input DC voltage into AC voltage in a full-bridge circuit, supplies the AC voltage via an insulated transformer to an output circuit, converts the AC voltage back into DC voltage in the output circuit, and outputs the DC voltage.

In the related art described in Japanese Patent Nos. 5,866,614 and 3,706,852, a plurality of switching elements provided in a full-bridge circuit are controlled by using what is called a phase shift method in such a way that switching loss in the switching elements is reduced. More specifically, in a switching power supply using the phase shift method, a resonant coil is provided between the full-bridge circuit and the insulated transformer, and the capacitance component of the switching elements provided in the full-bridge circuit and the inductance component of the resonant coil form a resonant circuit. The switching power supply using the phase shirt method is so set that the resonance action in the resonant circuit described above is completed in a dead time period provided to prevent two switching elements connected in series in the full-bridge circuit from not being turned on at the same time. The phase shift method therefore performs what is called zero voltage switching (ZVS) in which the voltage across the opposite ends of a switching element is reduced to zero voltage and the switching element is then turned on.

The related art described in Japanese Patent No. 5,866,614 is intended to improve the power conversion efficiency by shortening the dead time when the resonance cycle in the resonant circuit described above is shorter than a standard cycle. The related art described in Japanese Patent No. 3,706,852 is intended to reduce switching loss associated with a decrease in output current by calculating the resonance completion period based on the characteristics of the resonant circuit, the output current, and other factors and setting the dead time to be longer than or equal to the resonance completion period.

In a switching power supply using the phase shift method, however, when the output current decreases, the operating mode of the switching power supply changes, depending on the conditions under which the switching power supply operates, to a discontinuous current mode (DCM) in which the secondary-side switching current has an intermittent waveform. In this case, the dead time necessary for completion of the resonance action sharply increases as the energy in the resonant coil dissipates. However, in the related art described above, the resonance completion period calculated based on the characteristics of the resonant circuit, the output current, and other factors is not long enough to handle the sharp increase in the dead time in the discontinuous current mode. That is, in the related art described above, even when the dead time is continuously prolonged in accordance with a decrease in the output current, the prolonged dead time is insufficient as the dead time in which ZVS is established. The conversion efficiency of the switching power supply could therefore lower in the discontinuous current mode.

The present disclosure, in various embodiments, provides a switching power supply that appropriately sets the dead time even in the discontinuous current mode to suppress a decrease in the conversion efficiency.

SUMMARY

A switching power supply includes an insulated transformer including a primary-side coil and a secondary side coil, a full-bridge circuit that converts input DC power into AC power and outputs the AC power to the primary-side coil, an output circuit that converts AC power input from the secondary-side coil into DC power and outputs the DC power, and a control circuit that controls the full-bridge circuit by using a phase shift method based on voltage output by the output circuit, and when a measured value of the amount of phase shift determined from at least one of the voltage and current output by the output circuit is smaller than a theoretical value of the amount of phase shift corresponding to the switching power supply operating in a continuous current mode, the control circuit prolongs dead time used in the full-bridge circuit in accordance with the difference between the measured value and the theoretical value.

The switching power supply includes the full-bridge circuit controlled by using the phase shift method, and the control circuit controls the amount of phase shift to output desired output voltage. In this process, the control circuit determines the measured value of the amount of phase shift from the output circuit in the cycle of switching control that controls the full-bridge circuit. The control circuit further calculates the theoretical value of the amount of phase shift corresponding to the switching power supply operating in the continuous current mode and compares the measured value of the amount of phase shift with the theoretical value thereof. The control circuit then determines that the switching power supply operates in the discontinuous current mode when the measured value of the amount of phase shift has decreased to a value smaller than the theoretical value and prolongs the dead time used in the full-bridge circuit in accordance with the difference between the theoretical value and the measured value.

The thus configured embodiments of the present disclosure allow determination of the current mode of the switching power supply and handling of a sharp increase in the dead time necessary for establishment of ZVS in the discontinuous current mode. The present disclosure therefore provides an advantageous effect of providing a switching power supply that can appropriately set the dead time also in the discontinuous current mode to suppress a decrease in the conversion efficiency.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION

Embodiments of the present disclosure will be described below in detail with reference to the drawings.

Figure 1:
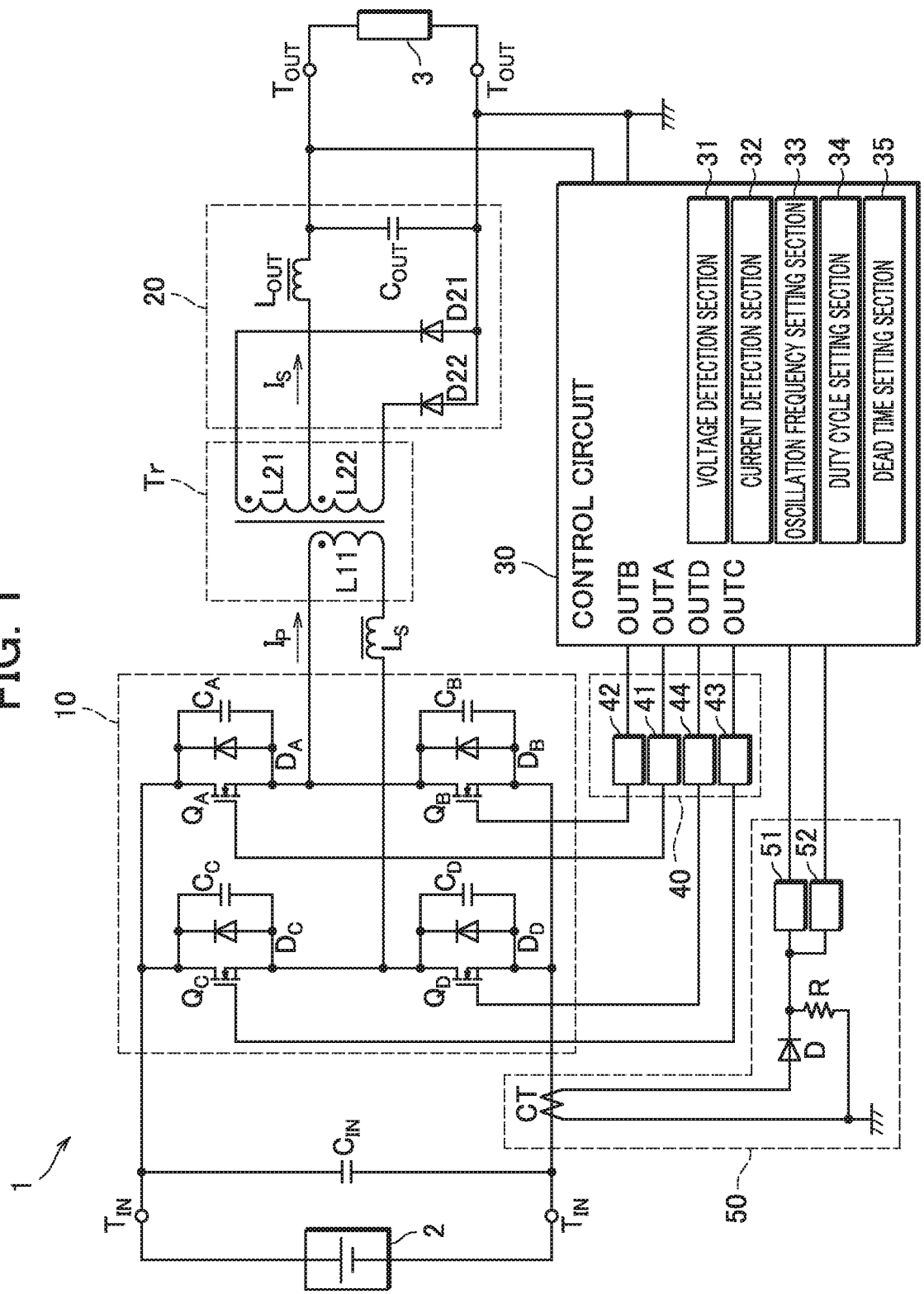
FIG. 1 is a circuit diagram showing the configuration of a switching power supply according to the present disclosure.

FIG. 1 is a circuit diagram showing the configuration of a switching power supply 1 according to the present disclosure. In the present embodiment, the switching power supply 1 is what is called a DC-DC converter in which an external power supply 2 is connected to two input terminals $T_{IN}$ and an external load 3 is connected to two output terminals $T_{OUT}$ so that DC input voltage $V_{IN}$ input from the external power supply 2 is converted into desired voltage and stable DC output voltage $V_{OUT}$ is output to the external load 3. The switching power supply 1 includes an input capacitor $C_{IN}$, a full-bridge circuit 10, an insulated transformer Tr, a resonant coil Ls, an output circuit 20, a control circuit 30, an insulation circuit 40, and a current detection circuit 50.

The input capacitor $C_{IN}$ has first and second ends connected to the two input terminals $T_{IN}$, respectively, and suppresses variation in the input voltage $V_{IN}$ input to the input terminals.

The full-bridge circuit 10 is a known full-bridge inverter circuit and is formed of four semiconductor switches $Q_A$ to $Q_D$. The full-bridge circuit 10 converts the DC power supplied from the external power supply 2 into AC power and outputs the AC power to the output circuit 20 via the insulated transformer Tr. In the present embodiment, the semiconductor switches $Q_A$ to $Q_D$ are each a MOSFET (metal oxide semiconductor field effect transistor) by way of example and may instead be a known bipolar transistor or an IGBT (insulated gate bipolar transistor).

The full-bridge circuit 10 is formed of a first leg formed of the semiconductor switches $Q_A$ and $Q_B$ and a second leg formed of the semiconductor switches $Q_C$ and $Q_D$. In the first leg, the drain of the semiconductor switch $Q_A$ is connected to the high-potential-side input terminal $T_{IN}$, and the source of the semiconductor switch $Q_B$ is connected to the low-potential-side input terminal $T_{IN}$. The source of the semiconductor switch $Q_A$ is connected to the drain of the semiconductor switch $Q_B$, and the connection point where the source and the drain are connected to each other is connected to the winding start e of the primary-side coil L11 of the insulated transformer Tr.

In the second leg, the drain of the semiconductor switch $Q_C$ is connected to the high-potential-side input terminal $T_{IN}$, and the source of the semiconductor switch $Q_D$ is connected to the low-potential-side input terminal $T_{IN}$. The source of the semiconductor switch $Q_C$ is connected to the drain of the semiconductor switch $Q_D$, and the connection point where the source and the drain are connected to each other is connected to the winding end edge of the primary-side coil L11 of the insulated transformer Tr via the resonant coil Ls. The resonant coil Ls is connected as an inductance element to the insulated transformer Tr in the present embodiment but may instead be leakage inductance of the insulated transformer Tr.

The four semiconductor switches $Q_A$ to $Q_D$ each have a gate independently connected to the control circuit 30 via the insulation circuit 40. The four semiconductor switches $Q_A$ to $Q_D$ are accompanied by parasitic diodes $D_A$ to $D_D$ and parasitic capacitors $C_A$ to $C_D$, respectively, as parasitic components between the source and the drain. The parasitic diodes $D_A$ to $D_D$ and parasitic capacitors $C_A$ to $C_D$ may be replaced with diode elements and capacitor elements connected to the semiconductor switches $Q_A$ to $Q_D$.

The insulated transformer Tr is a known transformer that insulatingly transmits power from the full-bridge circuit 10 on the primary side of the switching power supply 1 to the output circuit 20 on the secondary side of the switching power supply 1 and includes a primary-side coil L11 and secondary-side coils L21 and L22. The insulated transformer Tr is so configured that the winding end edge of the secondary-side coil L21 and the winding start edge of the secondary-side coil L22 are connected to each other at the connection point (center tap) where the two coils are connected to each other.

The output circuit 20 includes two diodes D21 and D22, a choke coil $L_{OUT}$, and an output capacitor $C_{OUT}$, rectifies and smoothens the AC power supplied from the full-bridge circuit 10 via the insulated transformer Tr to convert the AC power into DC power, and outputs the DC power to the output terminals $T_{OUT}$.

The diode D21 has a cathode connected to the winding start edge of the secondary-side coil L21, and the diode D22 has a cathode connected to the winding end edge of the secondary-side coil L22. Further, the diodes D21 and D22 each have an anode connected to the low-potential-side output terminal $T_{OUT}$. The choke coil $L_{OUT}$ has a first end connected to the center tap on the secondary side of the insulated transformer Tr and a second end connected to the high-potential-side output terminal $T_{OUT}$. The output capacitor $C_{OUT}$ has first and second ends connected to the two output terminals $T_{OUT}$, respectively.

The control circuit 30 includes a voltage detection section 31, a current detection section 32, an oscillation frequency setting section 33, a duty cycle setting section 34, and a dead time setting section 35 and controls the full-bridge circuit 10 by using PWM control based on detected output voltage $V_{OUT}$ and signals acquired from the current detection circuit 50, as will be described later in detail.

The voltage detection section 31 detects the output voltage $V_{OUT}$ across the two output terminals $T_{OUT}$. The current detection section 32 detects input current $I_{IN}$ and output current $I_{OUT}$ to and from the switching power supply 1 based on the signals provided via the current detection circuit 50, as will be described later in detail. The oscillation frequency setting section 33 lowers an oscillation frequency f (=1/T, T: oscillation cycle) in the PWM control when the output current $I_{OUT}$ provided from the current detection section 32 decreases to reduce switching loss and driving loss that occur when the semiconductor switches $Q_A$ to $Q_D$ perform switching and are driven. The duty cycle setting section 34 calculates the amount of phase shift $T_{ON}$ in the following cycle based on the output voltage $V_{OUT}$ provided from the voltage detection section 31 and the oscillation frequency f set by the oscillation frequency setting section 33 and sets a phase shift duty cycle DT (=$T_{ON}$/T). The dead time setting section 35 sets optimum dead time for the PWM control based on the output voltage $V_{OUT}$ detected by the voltage detection section 31 and the output current $I_{OUT}$ and the input current $I_{IN}$ detected by the current detection section 32, as will be described later in detail.

The control circuit 30 produces control signals OUTA to OUTD used in the PWM control and outputs the control signals OUTA to OUTD to the gates of the semiconductor switches $Q_A$ to $Q_D$, respectively, to drive the full-bridge circuit 10 by using the phase shift method. In this process, since the control output terminals OUTA to OUTD are connected to the gates of the semiconductor switches $Q_A$ to $Q_D$ via isolators 41 to 44 of the insulation circuit 40, the control circuit 30 and the full-bridge circuit 10 are insulated from each other in DC connection.

The current detection circuit 50 includes a current transformer CT, a diode element D, a resistor element R, a peak holding circuit 51, and an averaging circuit 52.

The current transformer CT is located between the sources of the semiconductor switches $Q_B$, $Q_D$ and the low-potential-side input terminal $T_{IN}$ and connected thereto and detects the primary-side pulsating switching current as pulsating voltage. The current transformer CT has a first end connected to the anode of the diode element D and a second end connected to a first end of the resistor element R and the ground. The diode element D has a cathode connected to a second end of the resistor element R and is further connected to the control circuit 30 via the peak holding circuit 51 and the averaging circuit 52, respectively.

The peak holding circuit 51 detects a peak value of the pulsating voltage detected by the current transformer CT and outputs the peak value to the control circuit 30. The peak value, which is proportional to the output current $I_{OUT}$, is converted by the current detection section 32 of the control circuit 30 and detected as the output current $I_{OUT}$.

The averaging circuit 52 detects the average of the pulsating voltage detected by the current transformer CT and outputs the average to the control circuit 30. The average, which is proportional to the input current $I_{IN}$, is converted by the current detection section 32 of the control circuit 30 and detected as the input current $I_{IN}$.

Figure 2:
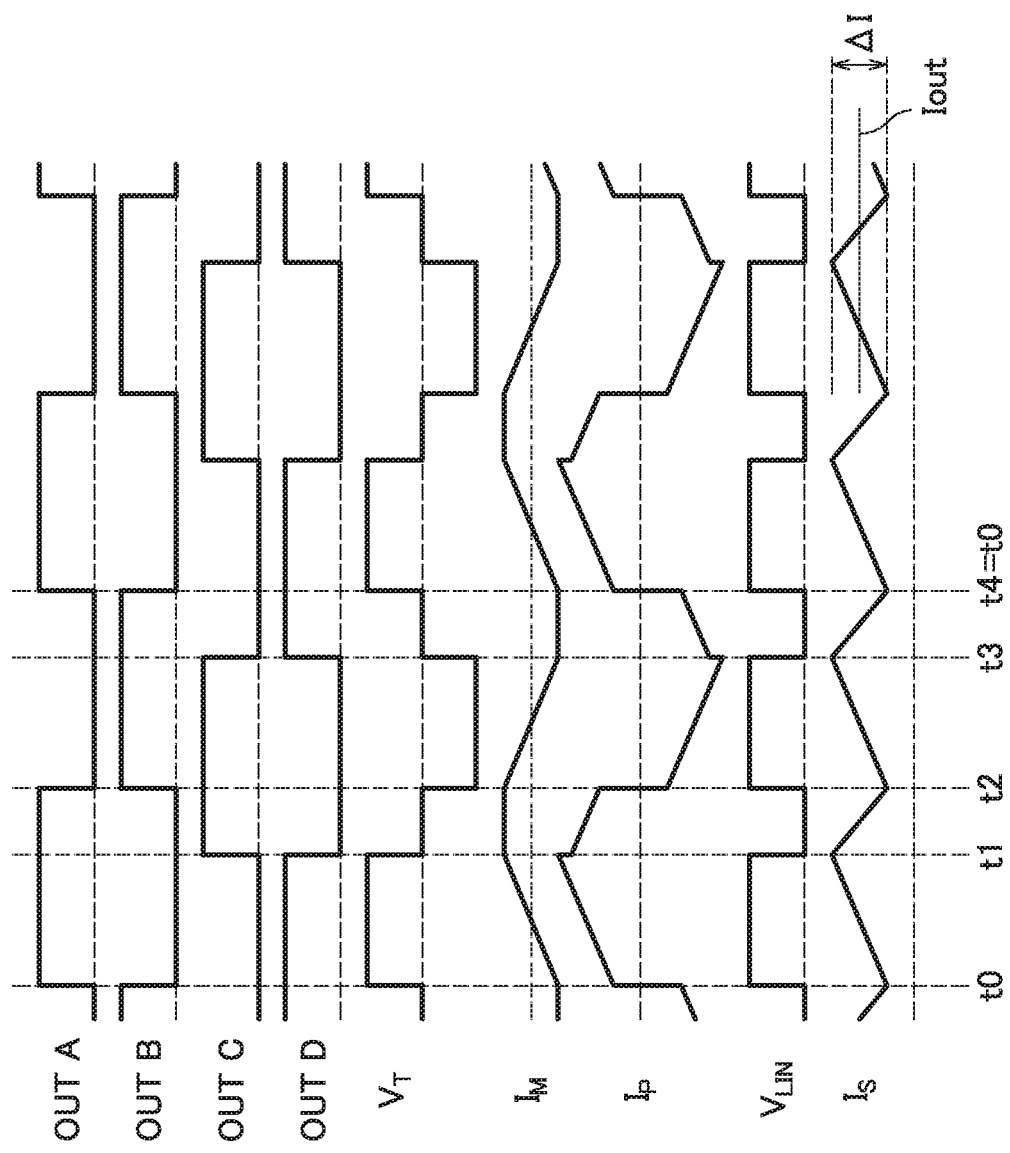
FIG. 2 is a timing chart showing the waveform in each section of the switching power supply in a continuous current mode.

The action of the switching power supply 1 will next be described. FIG. 2 is a timing chart showing the waveform in each section of the switching power supply 1 in a continuous current mode (CCM) in a case where the output current $I_{OUT}$ is sufficiently large. The control signals OUTA to OUTD show control signals output by the control circuit 30 to the gates of the semiconductor switches $Q_A$ to $Q_D$ of the full-bridge circuit 10. $V_T$ and $I_M$ represent changes in the voltage and current in the insulated transformer Tr. $I_P$ and $I_S$ represent primary-side switching current and secondary-side switching current, respectively, as shown in FIG. 1. $V_{LIN}$ represents input voltage to the choke coil $L_{OUT}$, that is, the voltage between the center tap of the insulated transformer Tr and the low-potential-side output terminal $T_{OUT}$.

In FIG. 2, in the PWM control performed by the control circuit 30, in which the period from time t0 to time t4 is the oscillation cycle T, the first leg is switched to the second leg at the times t0 and t2, and the second leg is switched to the first leg at the times t1 and t3. Slight dead time $T_{dAB}$ is provided (not shown in FIG. 2) at the timing when the control signals OUTA and OUTB are switched so that the semiconductor switches $Q_A$ and $Q_B$ are not turned on at the same time at the times t0 and t2. Similarly, slight dead time $T_{dCD}$ is provided (not shown in FIG. 2) at the timing when the control signals OUTC and OUTD are switched at the times t1 and t3.

The first leg formed of the semiconductor switches $Q_A$ and $Q_B$ and the second leg formed of the semiconductor switches $Q_C$ and $Q_D$ are switched from one to the other at the duty ratio of 50%, and the second leg is so set to be ahead of the first leg in terms of phase by the amount of phase shift $T_{ON}$ to form a period for which the insulated transformer Tr is excited, and power is supplied to the secondary side of the switching power supply 1 during the excitation period.

The amount of phase shift $T_{ON}$ is the length of the period for which the control signals OUTA and OUTD are both ON (t0 to t1) and the length of the period for which the control signals OUTA and OUTD are both OFF (t2 to t3). The control circuit 30 sets a large amount of phase shift $T_{ON}$ when the output voltage $V_{OUT}$ output by the output circuit 20 decreases and sets a small amount of phase shift $T_{ON}$ when the output voltage $V_{OUT}$ output by the output circuit 20 increases to stabilize the output voltage $V_{OUT}$.

The length of the amount of phase shift $T_{ON}$ correlates with the magnitudes of the output voltage $V_{OUT}$ and the output current $I_{OUT}$. The control circuit 30 can therefore determine the length of an actual amount of phase shift $T_{ON}$ as a measured value from at least one of the output voltage $V_{OUT}$ and the output current $I_{OUT}$.

The secondary-side switching current $I_S$ is triangular-wave current having a variation width ΔI and is smoothened by the choke coil $L_{OUT}$ and the output capacitor $C_{OUT}$ into stable output current $I_{OUT}$ having a magnitude equal to the average of the secondary-side switching current $I_S$.

Figure 3:
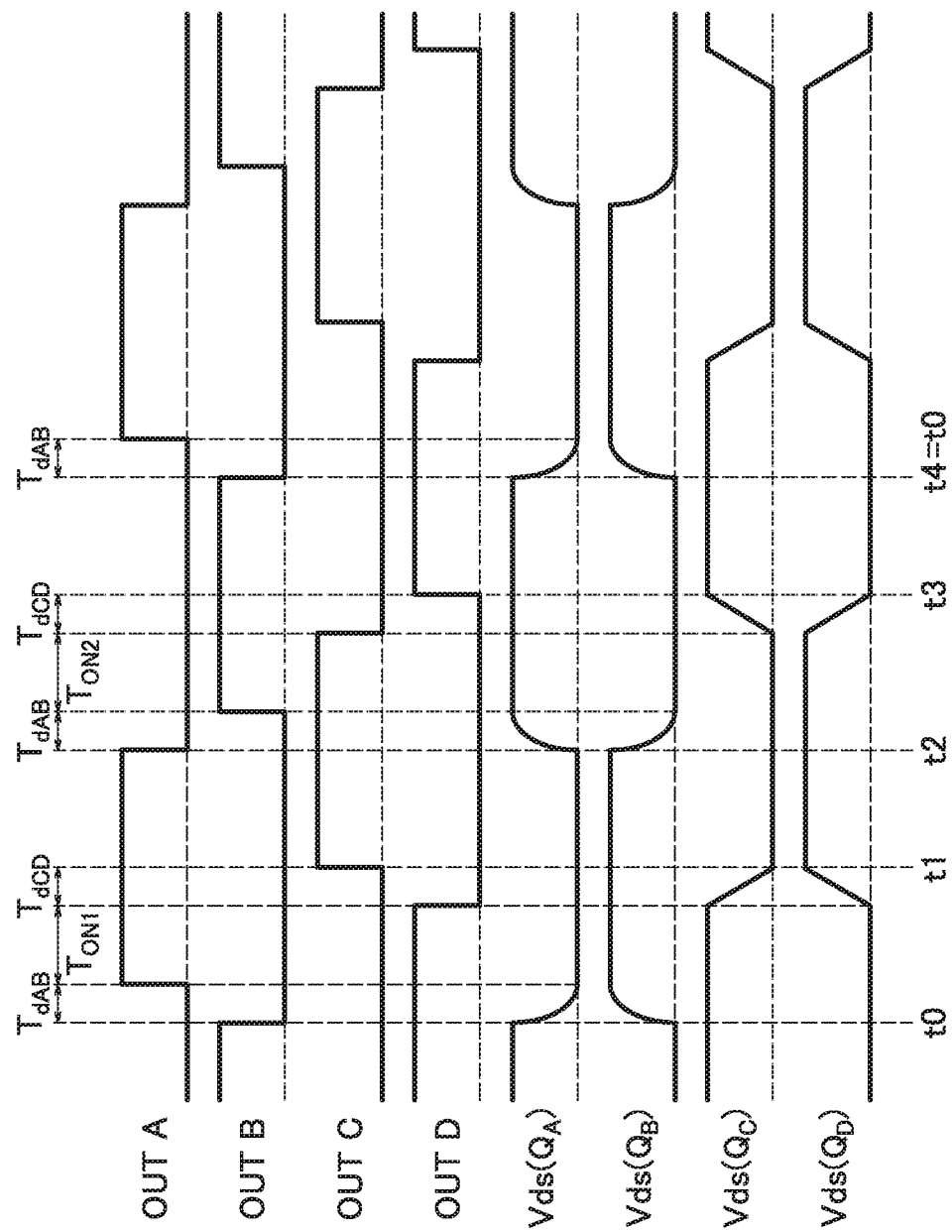
FIG. 3 is a timing chart of control signals and drain-source voltage of each semiconductor switch.

FIG. 3 is a timing chart of control signal OUTA to OUTD highlighting the dead times $T_{dAB}$ and $T_{dCD}$ and drain-source voltage Vds($Q_A$) to Vds($Q_D$) of semiconductor switches $Q_A$ to $Q_D$.

The dead time $T_{dAB}$ is the period from the time when one of the control signal OUTA and OUTB is switched to OFF to the time when the other is switched to ON, and what is called ZVS (zero voltage switching) is achieved by lowering for the period the drain-source voltage Vds of the semiconductor switches $Q_A$ or $Q_B$ that is switched to ON to zero volts.

Similarly, the dead time $T_{dCD}$ is the period from the time when one of the control signal OUTC and OUTD is switched to OFF to the time when the other is switched to ON, and ZVS is achieved by lowering for the period the drain-source voltage Vds of the semiconductor switches $Q_C$ or $Q_D$ that is switched to ON to zero volts.

Figure 4:
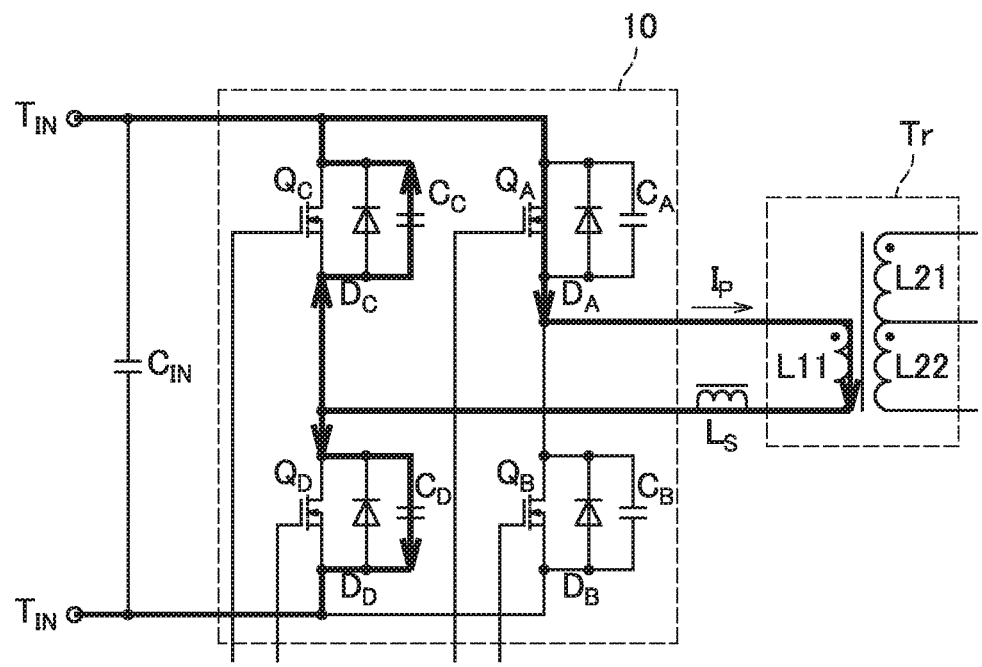
FIG. 4 is a circuit diagram showing the flow of current flowing through a full-bridge circuit during dead time.

More specifically, for example, in the period of the dead time $T_{dCD}$ immediately before the time T1, the full-bridge circuit 10 operates as shown in FIG. 4. FIG. 4 is a circuit diagram showing the flow of the current flowing through the full-bridge circuit 10 during the dead time $T_{dCD}$. During the dead time $T_{dCD}$, since the semiconductor switch $Q_D$ is switched to OFF, so that the drain-source voltage Vds($Q_D$) of the semiconductor switch $Q_D$ increases, and the increased voltage charges the parasitic capacitor $C_D$. At this point, the drain-source voltage Vds($Q_C$) of the semiconductor switch $Q_C$ decreases, so that the parasitic capacitor $C_C$ is discharged. That is, ZVS is established in the dead time $T_{dCD}$ after the charge and discharge of the parasitic capacitors $C_C$ and $C_D$ are completed.

Figure 5:
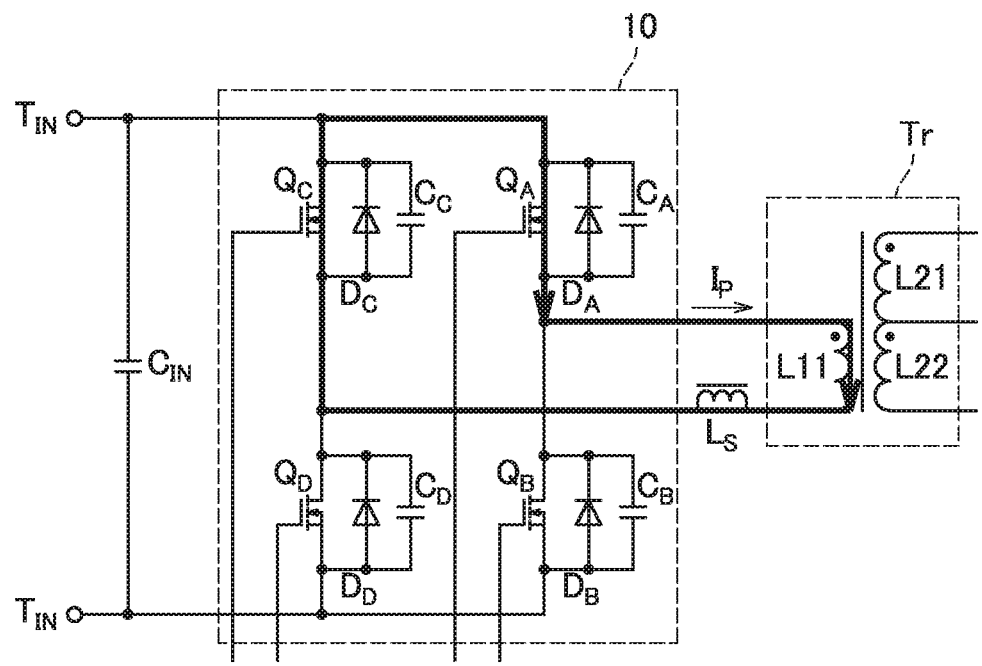
FIG. 5 is a circuit diagram showing the flow of the current flowing through the full-bridge circuit during a current circulation period.

Thereafter, when the period of the dead time $T_{dCD}$ ends, the semiconductor switch $Q_C$ is switched to ON, resulting in a current circulation period shown in FIG. 5. FIG. 5 is a circuit diagram showing the flow of the current flowing through the full-bridge circuit 10 during the current circulation period from the time t0 to the time t1. In the current circulation period, the semiconductor switch $Q_A$, the semiconductor switch $Q_C$, the primary-side coil L11, and the resonant coil Ls form a closed circuit, and current produced by the energy accumulated in the resonant coil Ls circulates through the closed circuit. In this process, the ON resistance of the semiconductor switches $Q_A$ and $Q_C$ and the resistance components of the resonant coil Ls, a wiring substrate of the switching power supply 1, and other components gradually reduce the energy accumulated in the resonant coil Ls.

When the output current $I_{OUT}$ decreases to a value smaller than half of the variation width ΔI of the secondary-side switching current $I_S$, the switching power supply 1 operates in the discontinuous current mode (DCM).

Figure 6:
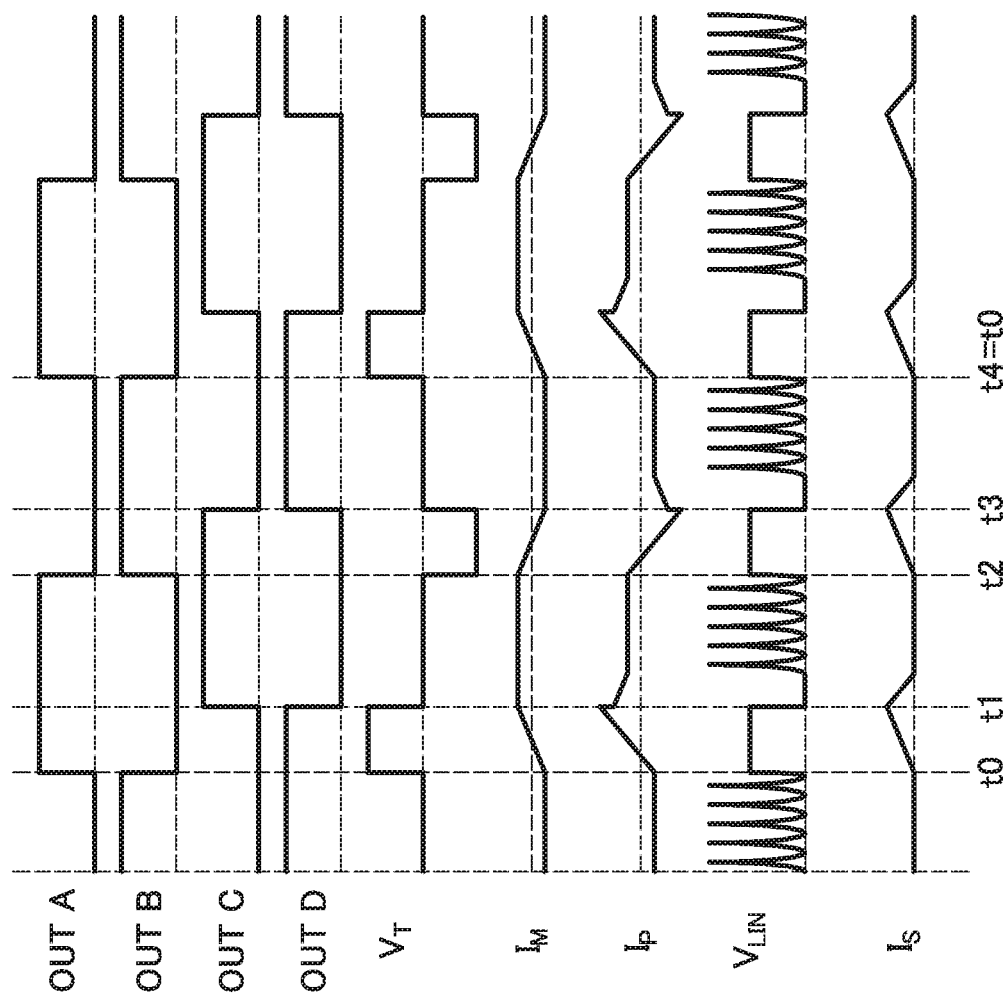
FIG. 6 is a timing chart showing the waveform in each portion of the switching power supply in a discontinuous current mode.

FIG. 6 is a timing chart showing the waveform in each portion of the switching power supply 1 in the discontinuous current mode. When the output current $I_{OUT}$ decreases to ΔI/2 or smaller so that the secondary-side switching current $I_S$ is discontinuous, the control circuit 30 controls the amount of phase shift $T_{ON}$ (t0 to t1, t2 to t3) to be shortened and the current circulation period (t1 to t2, t3 to t4) to be prolonged as the required output voltage $V_{OUT}$ decreases. When the current circulation period is prolonged, the energy accumulated in the resonant coil Ls further decreases and eventually completely dissipates. At this point, since the magnitude of the primary-side switching current $I_P$ flowing through the full-bridge circuit 10 is small, the current necessary for the charge and discharge of the parasitic capacitors $C_C$ and $C_D$ needs to be only the excitation current that excites the insulated transformer Tr. However, since the insulated transformer Tr is typically designed to be excited with excitation current having a small magnitude, the charge and discharge of the parasitic capacitors $C_C$ and $C_D$ take a long time to complete.

Figure 7:
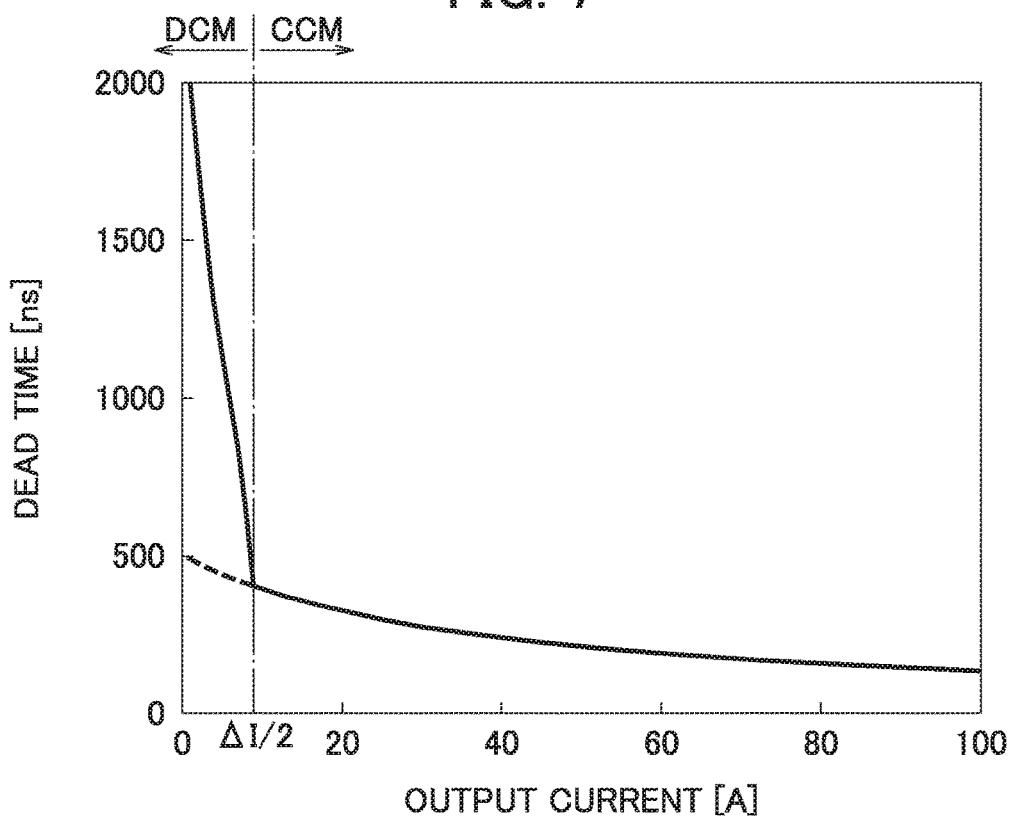
FIG. 7 is a graph representing an example of the length of dead time necessary for ZVS versus output current.

FIG. 7 is a graph representing an example of the length of the dead time $T_{dAB}$ necessary for ZVS versus the output current $I_{OUT}$. The required length of the dead time $T_{dAB}$ increases as the output current $I_{OUT}$ decreases. In particular, the length sharply increases in the discontinuous current mode (DCM). Therefore, in the switching power supplies of the related arts, even if the dead time is prolonged in accordance with a decrease in the output current $I_{OUT}$, as indicated by the broken line in FIG. 7, the prolonged dead time is not long enough for establishment of ZVS.

Further, the threshold at which the continuous current mode and the discontinuous current mode is switched from one to the other changes with the combination of the input voltage $V_{IN}$, the output voltage $V_{OUT}$, the oscillation frequency f, the inductance of the choke coil $L_{OUT}$, and the turn ratio of the insulated transformer Tr. Therefore, to set dead time necessary for ZVS, mode evaluation between the continuous current mode and the discontinuous current mode needs to be performed during the PWM control.

In the present disclosure, as described below, the control circuit 30 performs the mode evaluation and optimizes the dead time in the PWM control when the continuous current mode is switched to the discontinuous current mode.

The control circuit 30 first determines the length of an actual amount of phase shift $T_{ON}$ as a measured value during the PWM control based on the output voltage $V_{OUT}$ detected by the voltage detection section 31, as described above. The measured value of the amount of phase shift $T_{ON}$ may instead be determined based on the output current $I_{OUT}$ detected by the current detection section 32 via the averaging circuit 52 or may be determined based both on the output voltage $V_{OUT}$ and the output current $I_{OUT}$.

The control circuit 30 then calculates a theoretical value of the amount of phase shift $T_{ON}$ corresponding to the switching power supply 1 operating in the continuous current mode. More specifically, the control circuit 30 calculates a theoretical value of the amount of phase shift $T_{ON}$ based on the following Expression (1) described below along with the output voltage $V_{OUT}$ detected by the voltage detection section 31, the input voltage $V_{IN}$ input to the input terminals $T_{IN}$, and the oscillation cycle T. In Expression (1), K1 represent a voltage drop due to, for example, the ON resistance of the semiconductor switches $Q_A$ to $Q_D$, wiring resistance of a substrate, windings, and other components provided in the switching power supply 1, and the forward-direction resistance of each diode. K2 represents leakage inductance of the insulated transformer Tr and a turn count equivalent value of the resonant coil Ls. Further, $N_S$ represents the turn count of the secondary-side coils L21 and L22, and $N_P$ represents the turn count of the primary-side coil L11.

[Expression 1]

$$T_{ON} = \frac{V_{OUT} + K_1}{V_{IN} \times \left(\frac{N_S}{N_P + K_2}\right)} \times T \quad (1)$$

The switching power supply 1 in the present embodiment changes the oscillation cycle T in accordance with the output current $I_{OUT}$, for example, to improve the conversion efficiency η and suppress switching noise. In this case, when the oscillation cycle T is short, the variation width ΔI of the secondary-side switching current $I_S$ decreases, whereas when the oscillation cycle T is long, the variation width ΔI of the secondary-side switching current $I_S$ increases. As a result, the value of the output current $I_{OUT}$, in accordance with which the continuous current mode and the discontinuous current mode are switched from one to the other, also changes.

The configuration in which the control circuit 30 changes the oscillation cycle T in accordance with the output current $I_{OUT}$ is not essential to the present invention, and in a case where the oscillation cycle T is constant, the oscillation cycle T may be fixed in the calculation of the theoretical value of the amount of phase shift $T_{ON}$. In this case, the theoretical value of the amount of phase shift $T_{ON}$ is calculated based on the input voltage $V_{IN}$ and the output voltage $V_{OUT}$.

The theoretical value of the amount of phase shift $T_{ON}$ in the discontinuous current mode is not calculated by the control circuit 30 according to the present disclosure but can be expressed by the following Expression (2). In the expression, the parameters K1, K2, $N_S$, and $N_P$ are the same as those in Expression (1) described above.

[Expression 2]

$$T_{ON} = \sqrt{\frac{2 \times I_{OUT} \times L_{OUT} \times T \times (V_{OUT} + K_1)}{\left(V_{IN} \times \left(\frac{N_S}{N_P + K_2}\right)\right)^2 - \left(V_{OUT} \times \left(V_{IN} \times \left(\frac{N_S}{N_P + K_2}\right)\right)\right)}} \quad (2)$$

Expressions (1) and (2) show that the amount of phase shift $T_{ON}$ is not affected by the output current $I_{OUT}$ in the continuous current mode, but that the amount of phase shift $T_{ON}$ is affected by the output current $I_{OUT}$ in the discontinuous current mode. Further, the amount of phase shift $T_{ON}$ in the discontinuous current mode is smaller than the amount of phase shift $T_{ON}$ in the continuous current mode.

In a case where the switching power supply 1 includes a voltage detection mechanism for detecting the input voltage $V_{IN}$, the theoretical value of the amount of phase shift $T_{ON}$ in the continuous current mode can be directly calculated by Expression (1) described above. The control circuit 30 is, however, disposed on the secondary side of the switching power supply 1. Therefore, to introduce a voltage detection mechanism that detects the input voltage $V_{IN}$ on the primary side electrically insulated from the secondary side, the voltage detection mechanism needs a large-scale additional circuit. In view of the fact described above, in the present embodiment, the control circuit 30 calculates the input voltage $V_{IN}$ based on the following Expression (3) along with the input current $I_{IN}$, the output current $I_{OUT}$, the output voltage $V_{OUT}$ and the conversion efficiency η of the switching power supply 1.

[Expression 3]

$$V_{IN} = \frac{I_{OUT} \times V_{OUT}}{I_{IN} \times \eta} \quad (3)$$

The control circuit 30 subsequently calculates the difference between the measured value of the amount of phase shift $T_{ON}$ determined based on the output voltage $V_{OUT}$ and theoretical value of the amount of phase shift $T_{ON}$ calculated based on Expression (1). In a case where it is determined that there is no difference between the two value, it can be assumed that the switching power supply 1 operates in the continuous current mode, and the dead time is gradually prolonged when the output current $I_{OUT}$ decreases.

In contact, in a case where the measured value of the amount of phase shift $T_{ON}$ is smaller than the theoretical value thereof, the control circuit 30 determines that the switching power supply 1 operates in the discontinuous current mode. The control circuit 30 then further prolongs the dead time $T_{dAB}$ in the continuous current mode in accordance with the difference between the measured value and the theoretical value of the amount of phase shift $T_{ON}$ described above. The control circuit 30 can set dead time $T_{dAB}$ having an optimum length in the discontinuous current mode by performing an advance experiment and actual measurement of the relationship of the difference between the measured value and the theoretical value with a period necessary for completion of the resonance action and storing the relationship.

Figure 8:
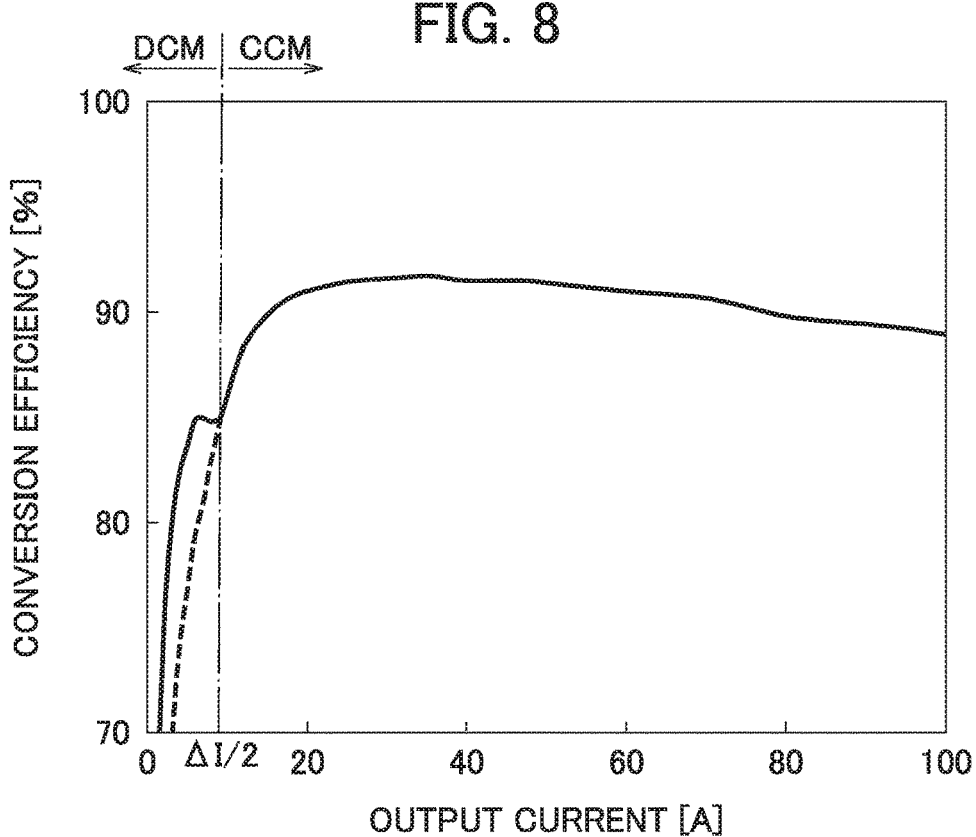
FIG. 8 is a graph representing an example of the conversion efficiency of the switching power supply according to the present disclosure.

FIG. 8 is a graph representing an example of the conversion efficiency η of the switching power supply 1 according to the present disclosure. FIG. 8 which shows the conversion efficiency η of the switching power supply 1 according to the present disclosure versus the output voltage $V_{OUT}$, indicates that a decrease in the conversion efficiency η is suppressed in the discontinuous current mode (DCM) as compared with the conversion efficiency in related art drawn with the broken line. That is, the switching power supply 1 according to the present disclosure determines the current mode and provides sufficiently long dead time $T_{dAB}$ required in the discontinuous current mode for improvement in the conversion efficiency.

As described above, the switching power supply 1 according to the present disclosure compares a measured value of the amount of phase shift $T_{ON}$ with a theoretical value of the amount of phase shift $T_{ON}$ corresponding to the switching power supply 1 operating in the continuous current mode to determine the current mode and prolongs the dead time $T_{dAB}$ used in the full-bridge circuit 10 in accordance with the difference between the measured value and the theoretical value. The thus configured switching power supply 1 can set dead time $T_{dAB}$ that allows establishment of ZVS also in the discontinuous current mode and can therefore suppress a decrease in the conversion efficiency η.

Further, the switching power supply 1 according to the present disclosure can calculate a theoretical value of the amount of phase shift $T_{ON}$ by using the calculation formula containing the oscillation cycle T and can therefore accurately determine the mode and set the dead time also in switching control in which the oscillation frequency f is variable.

Embodiments of the present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

<First Aspect of Present Disclosure>

A first aspect of the present disclosure relates to a switching power supply including an insulated transformer including a primary-side coil and a secondary side coil, a full-bridge circuit that converts input DC power into AC power and outputs the AC power to the primary-side coil, an output circuit that converts AC power input from the secondary-side coil into DC power and outputs the DC power, and a control circuit that controls the full-bridge circuit by using a phase shift method based on voltage output by the output circuit, and when a measured value of the amount of phase shift determined from at least one of the voltage and current output by the output circuit is smaller than a theoretical value of the amount of phase shift corresponding to the switching power supply operating in a continuous current mode, the control circuit prolongs dead time used in the full-bridge circuit in accordance with the difference between the measured value and the theoretical value.

The switching power supply includes the full-bridge circuit controlled by using the phase shift method, and the control circuit controls the amount of phase shift to output desired output voltage. In this process, the control circuit determines the measured value of the amount of phase shift from the output circuit in the cycle of switching control that controls the full-bridge circuit. The control circuit further calculates the theoretical value of the amount of phase shift corresponding to the switching power supply operating in the continuous current mode and compares the measured value of the amount of phase shift with the theoretical value thereof. The control circuit then determines that the switching power supply operates in the discontinuous current mode when the measured value of the amount of phase shift has decreased to a value smaller than the theoretical value and prolongs the dead time used in the full-bridge circuit in accordance with the difference between the theoretical value and the measured value.

The thus configured first aspect of the present disclosure allows determination of the current mode of the switching power supply and handling of a sharp increase in the dead time necessary for establishment of ZVS in the discontinuous current mode. The first aspect of the present disclosure therefore provides an advantageous effect of providing a switching power supply that can appropriately set the dead time also in the discontinuous current mode to suppress a decrease in the conversion efficiency.

<Second Aspect of Present Disclosure>

A second aspect of the present disclosure is the switching power supply according to the first aspect of the present disclosure described above and also so configured that the control circuit calculates the theoretical value of the amount of phase shift based on input voltage input to the full-bridge circuit and the output voltage output by the output circuit.

The switching power supply models the theoretical value of the amount of phase shift by using a calculation formula containing the input voltage and the output voltage and uses the theoretical value calculated by using the calculation formula to determine the current mode and set the dead time. The second aspect of the present disclosure therefore provides an advantageous effect of providing a switching power supply that readily determines the current mode for the combination of a variety of conditions relating to the switching of the current mode and can therefore more appropriately set the dead time.

<Third Aspect of Present Disclosure>

A third aspect of the present disclosure is the switching power supply according to the second aspect of the present disclosure described above and also so configured that the control circuit calculates the theoretical value of the amount of phase shift based also on the oscillation cycle in accordance with which the full-bridge circuit is controlled in addition to the input voltage and the output voltage.

The switching power supply changes the oscillation cycle in some cases in accordance with the output current in the switching control performed on the full-bridge circuit in order, for example, to improve the conversion efficiency and suppress switching noise. Since the theoretical value of the amount of phase shift, which is calculated to determine the current mode and set the dead time, is modeled in the form of the calculation formula containing the oscillation cycle in addition to the input voltage and the output voltage, the theoretical value is calculated as the amount of phase shift corresponding to a change in the oscillation cycle. The third aspect of the present disclosure therefore provides an advantageous effect of providing a switching power supply capable of setting optimum dead time even in the case where the oscillation cycle changes based on the theoretical value of the amount of phase shift corresponding to the change.

<Fourth Aspect of Present Disclosure>

A fourth aspect of the present disclosure is the switching power supply according to the third aspect of the present disclosure described above and also so configured that the theoretical value of the amount of phase shift is calculated by the following expression,

[Expression 1]

$$T_{ON} = \frac{V_{OUT} + K_1}{V_{IN} \times \left(\frac{N_S}{N_P + K_2}\right)} \times T$$

where $V_{OUT}$ represents the output voltage, $V_{IN}$ represents the input voltage, T represents the oscillation cycle, $N_P$ represents the turn count of the primary-side coil, and $N_S$ represents the turn count of the secondary-side coil with K1 and K2 being predetermined parameters.

The fourth aspect of the present disclosure therefore provides an advantageous effect of providing a switching power supply capable of calculating the theoretical value of the amount of phase shift by using the calculation formula described above using a variety of parameters representing the characteristics of the switching power supply to more precisely and readily determine the current mode and set the dead time.

<Fifth Aspect of Present Disclosure>

A fifth aspect of the present disclosure is the switching power supply according to the second aspect of the present disclosure described above and also so configured that the control circuit calculates the input voltage from input current input to the full-bridge circuit, output current output by the output circuit, the output voltage, and the conversion efficiency.

To allow the control circuit disposed on the secondary side of the switching power supply to directly detect the input voltage on the primary side electrically insulated from the secondary side, a large-scale additional circuit is undesirably required. In contrast, according to the fifth aspect of the present disclosure, the input voltage used to determine the theoretical value of the amount of phase shift is indirectly calculated from the input current, the output current, the output voltage and the conversion efficiency. The fifth aspect of the present disclosure therefore provides an advantageous effect of providing a switching power supply capable of determining the theoretical value of the amount of phase shift because the control circuit does not need to directly detect the input voltage so that no large-scale addition circuit does not need to be introduced.

What is claimed is:

1. A switching power supply comprising: an insulated transformer including a primary-side coil and a secondary side coil; a full-bridge circuit that converts input DC power into AC power and outputs the AC power to the primary-side coil; an output circuit that converts AC power input from the secondary-side coil into an output DC power and outputs the output DC power; and a control circuit that controls the full-bridge circuit by using a phase shift method based on voltage output by the output circuit, wherein when the switching power supply is determined to be in a discontinuous current mode when a measured value of an amount of phase shift determined from at least one of the voltage and current output by the output circuit is smaller than a theoretical value of the amount of phase shift corresponding to the switching power supply operating in a continuous current mode, the control circuit prolongs dead time used in the full-bridge circuit in accordance with a difference between the measured value and the theoretical value.

2. The switching power supply according to claim 1, wherein the control circuit calculates the theoretical value of the amount of phase shift based on input voltage input to the full-bridge circuit and output voltage output by the output circuit.

3. The switching power supply according to claim 2, wherein the control circuit calculates the theoretical value of the amount of phase shift based also on an oscillation cycle in accordance with which the full-bridge circuit is controlled in addition to the input voltage and the output voltage.

4. The switching power supply according to claim 3, wherein the theoretical value of the amount of phase shift is calculated by the following expression:

$$T_{ON} = \frac{V_{OUT} + K_1}{V_{IN} \times \left(\frac{N_S}{N_P + K_2}\right)} \times T$$

where $V_{OUT}$ represents the output voltage, $V_{IN}$ represents the input voltage, T represents the oscillation cycle, $N_P$ represents a turn count of the primary-side coil, and $N_S$ represents a turn count of the secondary-side coil with K1 and K2 being predetermined parameters.

5. The switching power supply according to claim 2, wherein the control circuit calculates the input voltage from input current input to the full-bridge circuit, output current output by the output circuit, the output voltage, and conversion efficiency.

\* \* \* \* \*